(12) United States Patent
Zhang et al.

(10) Patent No.: US 8,705,893 B1
(45) Date of Patent: Apr. 22, 2014

(54) APPARATUS AND METHOD FOR CREATING FLOOR PLANS

(71) Applicant: Palo Alto Research Center Incorporated, Palo Alto, CA (US)

(72) Inventors: Ying Zhang, Cupertino, CA (US); Juan Liu, Cupertino, CA (US); Craig Eldershaw, Belmont, CA (US); David Garcia, Stanford, CA (US); Daniel Davies, Palo Alto, CA (US); Kelly L. Coupe, San Jose, CA (US); Chuanjiang Luo, Columbus, OH (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/826,138

(22) Filed: Mar. 14, 2013

(51) Int. Cl.
*G06K 9/36* (2006.01)

(52) U.S. Cl.
USPC ............ 382/285; 382/276; 382/154; 345/418

(58) Field of Classification Search
USPC .......... 382/154, 276, 285; 345/419, 418, 424, 345/427; 348/578, 580; 340/815.4; 715/772
See application file for complete search history.

(56) References Cited

U.S. PATENT DOCUMENTS

| | | | |
|---|---|---|---|
| 7,366,632 B2 | 4/2008 | Hamann et al. | |
| 2009/0216501 A1* | 8/2009 | Yeow et al. | 703/1 |
| 2011/0137561 A1* | 6/2011 | Kankainen | 701/300 |
| 2011/0211040 A1 | 9/2011 | Lindemann et al. | |
| 2012/0039526 A1* | 2/2012 | Garaas et al. | 382/154 |

OTHER PUBLICATIONS

Zhang, et al., "Walk&Sketch: Create Floor Plans with and RGB-D Camera," *UbiComp* '12, Sep. 5-Sep. 8, 2012, Pittsburgh, PA, USA.
J.-Y. Bouguet, "Camera Calibration Toolbox for Matlab," pp. 1-4, http://www.vision.caltech.edu/bougueti/calib_doc/, 2012.
J. Davison, et al., "MonoSLAM: Real-Time Single Camera SLAM," *IEEE Transactions on Pattern Analysis and Machine Intelligence*, Jun. 2007, pp. 1-16, vol. 29, No. 6, IEEE Computer Society.
Du, et al., "Interactive 3D Modeling of Indoor Environments with a Consumer Depth Camera," ACM *Conference on Ubiquitous Computing*, 2011.
A. Elfes, "Using Occupancy Grids for Mobile Robot Perception and Navigation," *Computer*, 22:46-57, Jun. 1989.
"Floor Planner." The easiest way to create floor plans. http://floorplanner.com/, 2012.

(Continued)

*Primary Examiner* — Ali Bayat
(74) *Attorney, Agent, or Firm* — Fay Sharpe LLP

(57) ABSTRACT

A system which generates a floor plan of a building includes: a camera which obtains a series of images as it is moved, each image represented by a first data set representing color and a second 3D data set representing depth. A processor generates the floor plan from the image data, defined by polylines that represent structures of the building and polygons that represent an area which has been observed by the camera. Suitably, the processor: performs a local matching sub-process which is operative to align two adjacent images with one another; performs a global matching sub-process in which key images and registered to one another; finds a 2D subset of points from the image data associated with each image, corresponding to a plane defined therethrough; determines the polylines based on said subset of points; and defines the polygons based on the polylines and a determined pose of the camera.

17 Claims, 16 Drawing Sheets

(56) References Cited

OTHER PUBLICATIONS

A. P. Gee, et al., "Real-Time Model-Based SLAM Using Line Segments," *Advances in Visual Computing*, 2006, pp. 354-363, vol. 4292, Springer-Verlag.

G. Grisetti, et al., "Hierarchical Optimization on Manifolds for Online 2D and 3D Mapping," IEEE International Conference on Robotics and Automation, May 3-8, 2010, pp. 273-278, Anchorage, Alaska, USA.

G. Grisetti, et al., "Non-Linear Constraint Network Optimization for Efficient Map Learning," *IEEE Transactions on Intelligent Transportation Systems*, vol. 10, pp. 428-439.

G. Grisetti, et al., "A Tree Parameterization for Efficiently Computing Maximum Likelihood Maps Using Gradient Descent," *Robotics: Science and Systems (RSS)*, 2007.

A. Harati, et al., "Orthogonal 3D-SLAM for Indoor Environments Using Right Angle Corners," *Third European Conference on Mobile Robots*, 2007.

P. Henry, et al., "RGB-D Mapping: Using Depth Cameras for Dense 3D Modeling of Indoor Environments, Advanced Reasoning with Depth Cameras Workshop in Conjunction with RSS,"2010.

ICP. http://www.mathworks.com/matlabcentral/fileexchange/217804-iterative-closest-point, 2012.

S. Izadi, et al., "KinectFusion: Real-time 3D Reconstruction and Interaction Using a Moving Depth Camera," *ACM Symposium on User Interface Software and Technology*, 2011.

G. Klein, et al., "Parallel Tracking and Mapping for Small AR Workspaces," *IEEE International Symposium Mixed and Augmented Reality (ISMAR'07)*, 2007.

J. Liu, et al., "Real-Time Outline Mapping for Mobile Blind Robots," *IEEE International Conference on Robotics and Automation*, May 9-13, 2011, pp. 1503-1510, Shanghai, China.

D. G. Lovve, "Distinctive Image Features from Scale-Invariant Keypoints," *International Journal of computer Vision*, 2004, pp. 1-28.

Microsoft Kinect. http://www.xbox.com/en-US/kinect, pp. 1-4, 2012.

A. Nüchter, "3D Robotic Mapping: The Simultaneous Localization and Mapping Problem with Six Degrees of Freedom," 2007, $1^{st}$ Edition, Springer Publishing Company, Incorporated.

R. A. Newcombe, et al., "KinectFusion: Real-Time Dense Surface Mapping and Tracking," *IEEE International Symposium in Mixed and Augmented Reality (ISMAR)*, 2011.

R. A. Newcombe, et al., "DTAM: Dense Tracking and Mapping in Real-Time," $13^{th}$ *International Conference on Computer Vision*, 2011.

V. Nguyen, et al., "Orthogonal SLAM: A Step Toward Lightweight Indoor Autonomous Navigation," *IEEE/RSJ International Conference on Intelligent Roots and Systems*, 2006.

V. Nguyen, et al., "A Comparison of Line Extraction Algorithms Using 2D Laser Rangefinder for Indoor Mobile Robotics," *IEEE/RSJ International Conference on Intelligent Robots and Systems*, 2005.

Ransac. http://wvvw.csse.uwa.edu.au/~pk/research/matlabfns/Robust/ransac.m, 2012.

S. Rusinkiewicz, et al., "Efficient Variants of the ICP Algorithm," *Third International Conference on 3D Digital Imaging and Modeling (3DIM)*, Jun. 2001.

A. Segal, et al., "Generalized-ICP," Proceedings of Robotics: Science and Systems, Jun. 2009, Seattle, Washington, USA.

SenionLab. http://wvvw.senionlab.com, 2012.

Sensopia. MagicPlan: As easy as taking a picture. http://www.sensopia.com/endish/index.html, 2012.

SIFT. http://sosurceforge.net/projects/libsift/ (contains a DLL library, 2012.

C. Wu, SiftGPU: A GPU Implementation of Scale Invariant Feature Transform (SIFT). http://cs.unc.edu/~ccwu/siftgpu, 2007.

O. Wulf, et al., 2D Mapping of Cluttered Indoor Environments by Means of 3D Perception, *IEEE International Conference on Robotics and Automation* (ICRA04), 2004.

M. F. Fallon, et al., "Efficient Scene Simulation for Robust Monte Carlo Localization Using an RGB-D Camera," In Proceedings of the *IEEE International Conference on Robotics and Automation (ICRA)*, St. Paul, MN. May 2012.

"Mobile Measurement Technology (MMT)," *IBM Global Technology Services, IBM Corporation*, 2008.

L. Hardesty, "Automatic Building Mapping Could Help Emergency Responders," MIT News Office, Sep. 23, 2012.

M. Alba, et al., "Mapping Infrared Data on Terrestrial Laser Scanning 3D Models of Buildings," *Remote Sensing*, 2011, pp. 1847-1870.

D. Iwaszczuk et al., "Detection of Windows in Ir Building Textures Using Masked Correlation," *Photogrammetty & Remote Sensing*, Munich, Germany, 2011, pp. 133-146.

* cited by examiner

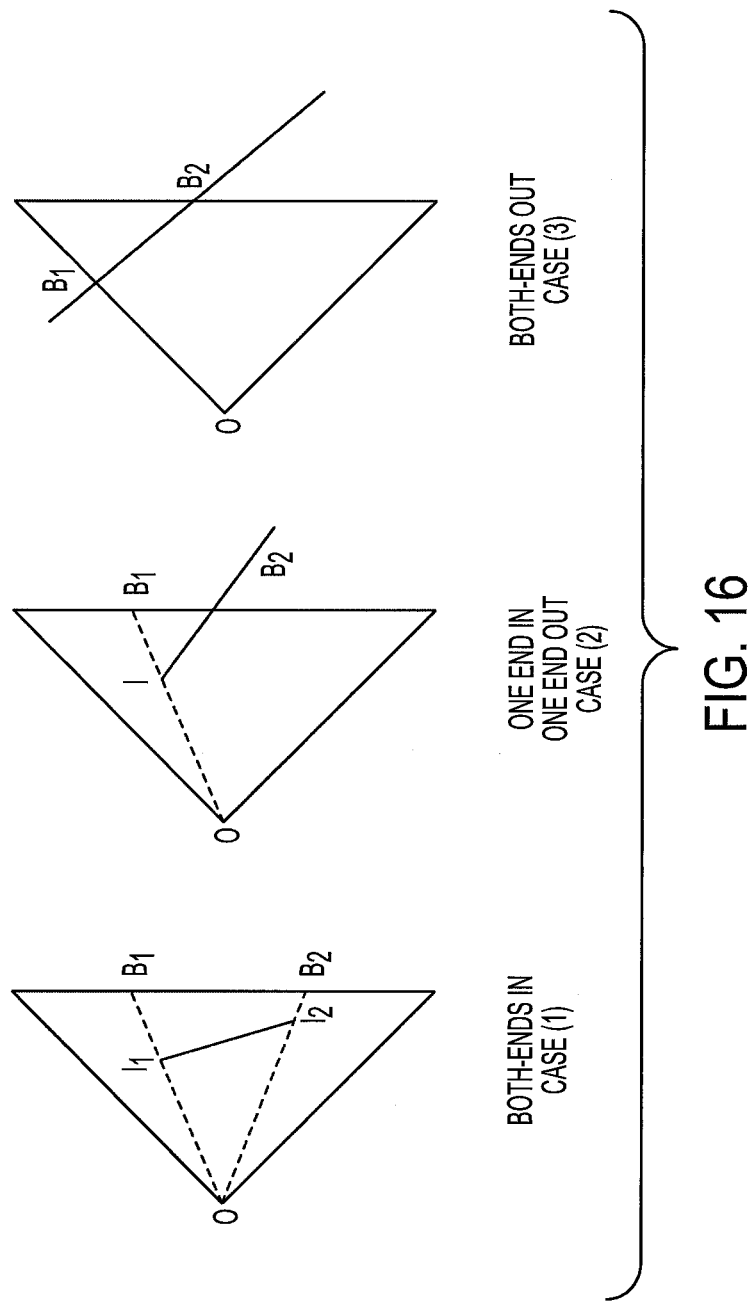

APPARATUS AND METHOD FOR CREATING FLOOR PLANS

BACKGROUND

The present inventive subject matter relates generally to the art of floor plan mapping and/or creation. Particular but not exclusive relevance is found in connection with generating two-dimensional (2D) floor plans of building interiors and the like. Accordingly, the present specification makes specific reference thereto. It is to be appreciated however that aspects of the present inventive subject matter are also equally amenable to other like applications.

Accurate and/or up-to-date floor plans for buildings can be important in space planning, navigation, and other location-based services. However, not all buildings have accurate and/or up-to-date floor plans readily available. Furthermore, remodeling or repartitioning of a building, which is not uncommon in residential and/or commercial buildings, can render an existing floor plan obsolete.

Currently, one common practice to obtain a building floor plan is by manual surveying. However, creating building floor plans for large areas via manual surveying can be labor-intensive and/or error-prone. Some other automatic approaches to floor plan creation can employ relatively costly equipment, e.g., such as laser range finders or the like, making it impractical for some users and/or some circumstances. Other mapping approaches generate three-dimensional (3D) models which can be unduly complex and/or too computationally intensive, e.g., when a relatively simpler 2D floor plan is all that is desired.

Accordingly, a new and/or improved method, system and/or apparatus for creating a floor plan is disclosed which addresses the above-referenced problem(s) and/or others.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a system is provided for automatically generating a two-dimensional (2D) floor plan of a building being studied. The system includes: a camera that is employed to obtain a series of images over time as the camera is moved about a floor of the building being studied. Each obtained image is represented by image data including a first set of data representing one or more color values of points observed by the camera and a second set of three-dimensional (3D) data representative of distances from the camera to the points observed by the camera. The system further includes a processor provisioned to generate the 2D floor plan from the image data, the 2D floor plan being defined by one or more polylines that represent one or more structures of the building and one or more polygons that represent an area of the floor which has been observed by the camera. To generate the 2D floor plan, the processor: (i) performs a local matching sub-process which is operative to align two adjacent images with one another, the adjacent images being obtained by the camera one after another in time; (ii) performs a global matching sub-process in which one or more key images are identified from the series of image and two key images, obtained by the camera apart in time from one another but sharing similar image content, are registered to one another; (iii) finds, for each image of the series, a 2D subset of points from the image data associated with each image, the 2D subset of points corresponding to a plane defined through the image data; (iv) determines the polylines based on the 2D subset of points; and (v) defines the polygons based on the determined polylines and a determined pose of the camera.

In accordance with another embodiment, a method is provided for automatically generating a two-dimensional (2D) floor plan of a building being studied. The method includes: obtaining a series of images captured over time by a camera as the camera is moved about a floor of the building being studied, each obtained image being represented by image data including a first set of data representing one or more color values of points observed by the camera and a second set of three-dimensional (3D) data representative of distances from the camera to the points observed by the camera; and generating the 2D floor plan from the image data, the 2D floor plan being defined by one or more polylines that represent one or more structures of the building and one or more polygons that represent an area of the floor which has been observed by the camera. Suitably, the foregoing generating includes: performing a local matching sub-process which is operative to align two adjacent images with one another, the adjacent images being obtained by the camera one after another in time; performing a global matching sub-process in which one or more key images are identified from the series of image and two key images, obtained by the camera apart in time from one another but sharing similar image content, are registered to one another; finding, for each image of the series, a 2D subset of points from the image data associated with each image, the 2D subset of points corresponding to a plane defined through the image data; determining the polylines based on said 2D subset of points; and defining the polygons based on the determined polylines and a determined pose of the camera.

Numerous advantages and benefits of the inventive subject matter disclosed herein will become apparent to those of ordinary skill in the art upon reading and understanding the present specification.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

FIG. 16 is a diagram showing examples of the viewing polygon from FIG. 15 clipped by polylines illustrating aspects of a process for defining an explored region in accordance with aspect of the present inventive subject matter.

DETAILED DESCRIPTION OF THE EMBODIMENT(S)

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred and/or other exemplary embodiment(s) presented herein.

In general, the present specification describes a camera system and/or method that automatically generates a floor plan and/or map of a building floor or the like which is being studied. In one embodiment, the camera and/or system is carried by a user or otherwise moved through and/or around the building floor being studied. As the camera and/or system is so moved, an extensive series of images or video frames of the scene observed by the camera are captured and/or otherwise obtained. Suitably, a 2D floor plan (e.g., in the form of an electronic or virtual 2D model) is incrementally constructed or created (i.e., grown) from the image data, e.g., in real-time or near real-time by an associated data processor, computer or the like.

Figure 1:
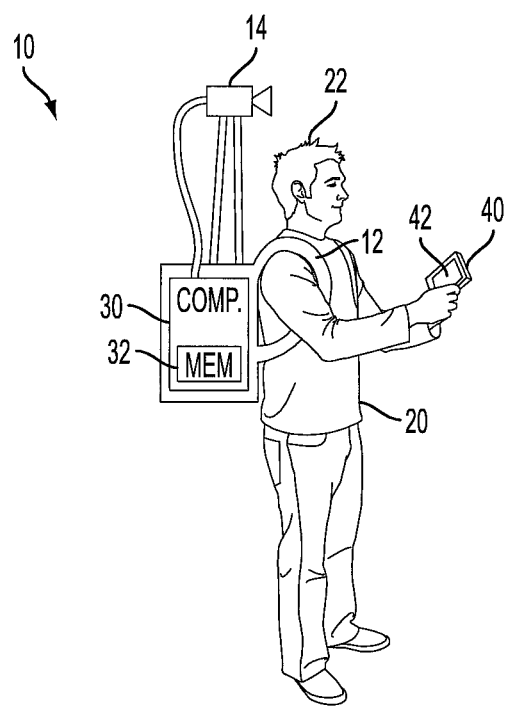
FIG. 1 is a diagrammatic illustration showing an exemplary camera system suitable for practicing aspect of the present inventive subject matter.

With reference now to FIG. 1, there is shown a mobile and/or portable camera system 10. As shown, the system 10 is provisioned on a backpack 12 or other wearable harness or the like so that the system may be readily carried by a user 20 as they walk, e.g., at a normal strolling pace, through and/or around the floor of the building for which the floor plan is being created.

Suitably, the system 10 also includes a camera 14 mounted accordingly on the backpack 12 or otherwise arranged, e.g., as shown on top of the backpack 12 above a head 22 of the user 20 carrying the same. In one exemplary embodiment, the camera 14 is a digital RGB-D (Red, Green, Blue—Depth) video camera. That is to say, the camera 14 obtains digital images or video frames of an observed scene in which each pixel of each image or frame is defined by: (i) three color component values, namely, a red value (R), a green value (G) and a blue value (B), which combined correspond to the observed hue or color at the pixel location; and (ii) a depth value (D) corresponding to the distance from the camera 14 to the observed point represented by the pixel. For example, without limitation, one such consumer camera commonly known as a "Kinect" camera is commercially available from the Microsoft Corporation. Of course, in practice, other suitable 3D (three-dimensional), ranging and/or depth cameras as they are commonly referred to in the art can similarly be used. As mentioned, the camera 14 is suitably a motion or video camera obtaining successive video frames of the observed scene continually and/or in rapid succession, e.g., as the user 20 and/or camera 14 moves about the floor of the building being studied. Alternately, the camera 14 may be a still camera 14 which is operated to capture or otherwise obtain an extensive series of images in rapid succession. For example, the video frame capture frequency and/or imaging rate of the camera 14 may be effectively set to approximately 10 hertz (Hz), i.e., 10 images or video frames per second are obtained by the camera 14 and/or employed for processing accordingly as described herein.

In the illustrated embodiment, the system 10 is provisioned on a wearable backpack 12 or the like. However, it is to be appreciated that optionally the system 10 may be provisioned on a wheeled cart or the like which facilitates movement of the system 10 and/or camera 12 through a building while resting on the floor.

As shown, an on-board computer 30 and/or other suitable data processor or the like collects, records and/or processes the images, video frames, data, measurements and/or other information obtained by the camera 14 and/or system 10 to generate, construct or otherwise create a floor plan or map of the building floor studied. For example, the computer 30 may be a laptop or other portable computer carried in or on the backpack 12. Suitably, the created floor plan is a 2D floor plan that may optionally be incrementally constructed (e.g., in real-time or near real-time) as the image data, video frames and/or other measurements and information is captured or otherwise obtained by the camera 14 and/or system 10. For example, the created 2D floor plan suitably takes the form of an electronic or other data representation and/or a virtual model which is representative of the building floor studied.

In one suitable embodiment, the computer 30 may be wired to the camera 14 to receive data therefrom and/or otherwise communicate therewith, e.g., via a Universal Serial Bus (USB) port or the like. Alternately, the computer 30 and/or camera 14 may be equipped to communicate with one another and/or exchange data wirelessly. A battery pack (not shown) may also be provided on or in the backpack 12 to power the camera 14 and/or the computer 30.

An optional handheld device 40 suitably includes a monitor or display screen 42 on which the created 2D floor may be selectively rendered or otherwise visibly output, e.g., in real-time or near real-time as it incrementally grows. For example, the handheld device 40 may a tablet computer, smartphone or the like which wirelessly exchanges data and/or otherwise communicates with the computer 30. Alternately, the handheld device 40 may be wired to the computer 30 to exchange data and/or otherwise communicate therewith. Optionally, the aforementioned battery pack may also power the handheld device 40.

In practice, the screen 42 may be a touch screen which acts as a user interface and/or the device 40 may otherwise provide a user interface through which the user 20 may interact with and/or selective operate the system 10. For example, the user interface may include an option for the user 20 to enter and/or save annotations at selected points on the created floor plan and/or manually override the automatically created floor plan and/or make corrections or changes to the floor plan as they see fit.

In one optional embodiment, the separate computer 30 may be omitted and the camera 14 may communicate and/or exchange data with the handheld device 40, either via a wired connection or wirelessly. Accordingly, in such an embodiment, the handheld device 40 is in turn equipped with a data processor or the like along with a memory and/or other data storage and other adjunct elements that are together provisioned to carry out the steps, functions and/or operations which would otherwise be executed by the computer 30 as described elsewhere herein.

It is to be appreciated that optionally the data processing may be remotely located and/or conducted off-board. For example, the measurements, images, video frames and/or other data obtained by the camera 14, various instruments and/or other modules or parts of the system 10 may be wirelessly or otherwise transmitted to a remote computer or processor for processing; and/or the measurements, images, video frames and/or other data may be saved and/or stored locally (e.g., in a memory of the computer 30 or device 40) and the system 10 may be later connected and/or the data downloaded to a computer or other suitable processor for processing.

Figure 2:
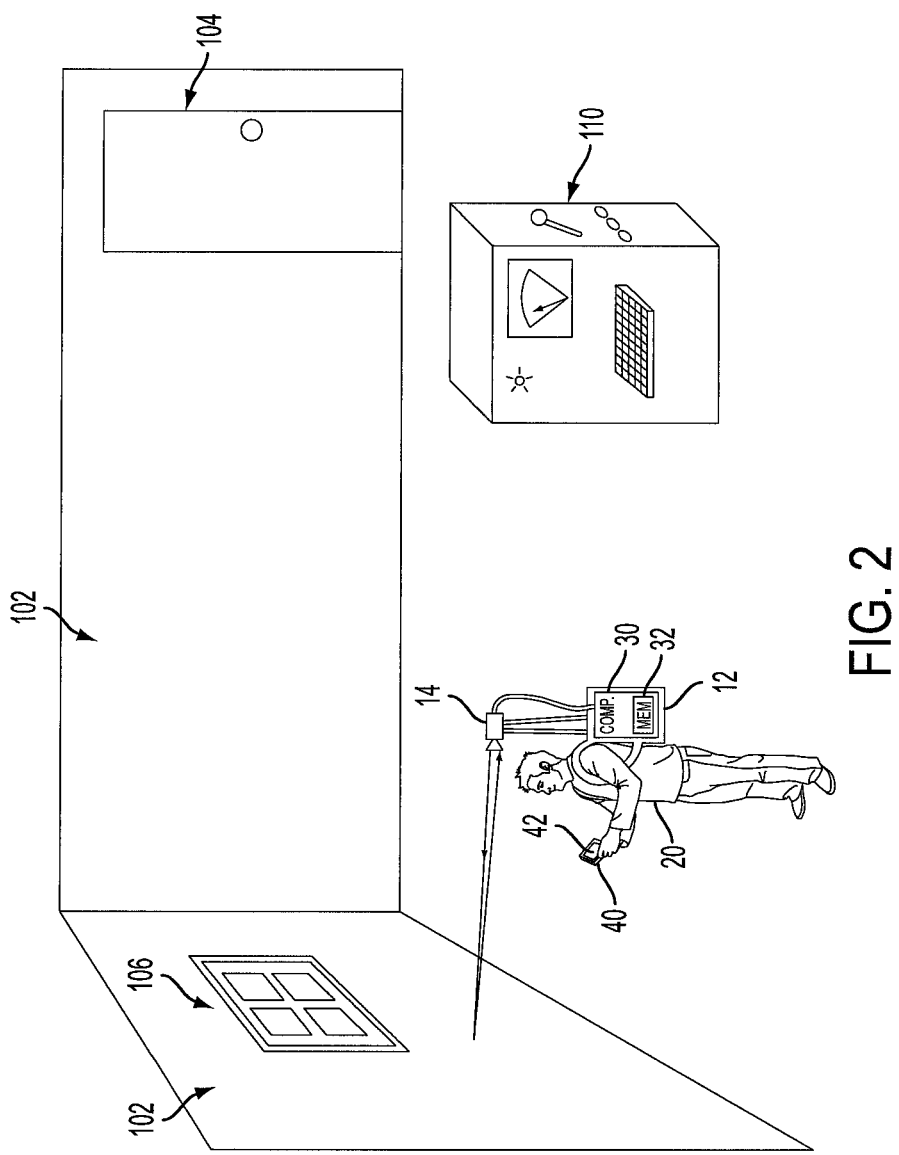
FIG. 2 is a diagrammatic illustration showing the camera system of FIG. 1 in one exemplary environment suitable for its operation.

FIG. 2 illustrates the system 10 in an exemplary environment in which it may operate. As shown, a building 100 (or portion thereof) being studied with the system 10 has one or more walls 102, e.g., including interior and/or exterior walls, and there may be one or more doors 104, windows 106 or the like in any one of the walls 102. Of course, each floor or level of the building may include a floor and a ceiling as well. Additionally, the building 100 may have various items, such as equipment, appliances, cabinets, furnishings and/or other contents 110 housed therein. As shown, the camera 14 is viewing and measuring distances to various points on a wall 102 of the building 100. Similarly, it is to be appreciated that the camera 14 and/or other instruments, modules and/or parts of the system 10 view, measure, detect, sense and/or obtain data from and/or images of the other building structures and/or contents as well. Generally, as used herein, the terms building and/or building structures and/or the contents thereof include the walls, floors, ceilings, windows, doors and other parts or structures of and/or contents in the building which are observed, imaged, measured, located and/or otherwise detected by and/or sensed by the camera 14 and/or the other instruments, modules and/or parts of the system 10 to generate the floor plan as described herein.

Returning attention now to FIG. 1, suitably, the computer 30 and/or processor may be equipped with and/or have access to a memory 32 and/or other suitable data storage device in which various measurements, images, video frames, information and/or other data (e.g., obtained, collected and/or generated by the camera 14 and/or the various components, instruments, parts and/or modules of the system 10) are stored. The memory 32 or other storage device may also be used to save any resulting processed data, information and/or generated outputs, e.g., such as the generated floor plan of the building floor being studied and/or other intermediate results, annotations, etc. In addition, the memory 32 and/or data storage device may also contain software, programming code and/or other suitable instructions which are selectively executed by the computer 30 and/or processor to: i) carry out the various data and/or information processing described herein; and/or ii) communicate with and/or control the camera 14, the handheld device 40 and/or the various components, instruments, parts and/or modules of the system 10 to achieve the operation thereof as described herein.

In practice, the camera 14 and/or system 10 is moved about an interior floor of a building or other like structure being studied. For example, a user wearing the backpack 12 walks or strolls at a normal pace (e.g., approximately 0.5 meters (m) per second (s)) down the hallways and/or corridors and/or through the various rooms of a given floor of the building. Suitably, the camera 14 observes, videos and/or images nearby and/or surrounding walls, ceilings, floors and/or other like structures of and/or contents in the building as it is being moved about a given floor of the building. In one exemplary embodiment, the camera 14 is mounted on the backpack 12 and/or otherwise arranged so as to be slightly tilted (e.g., between approximately 5 to approximately 10 degrees) toward the floor. Such a trajectory range has been found to result in stable heights frame-by-frame with the floor plane in view from time-to-time as a horizontal reference.

In turn, the acquired RGB-D video and/or image data from the camera 14 is accordingly processed (e.g., by the computer 30 or handheld device 40 or otherwise) as described herein to generate a 2D floor plan of the floor so studied. Generally, the employed method and processing computes 2D floor plans and/or maps represented by polylines from a 3D point cloud based on precise frame-to-frame alignment of the video frames. It aligns a reference frame with the floor and computes the frame-to-frame offsets from the continuous or near continuous RGB-D input obtained by the camera 14. Line segments at a certain height are extracted from the 3D point cloud, and are merged to form a polyline map or floor plan, which can be further modified and annotated by the user 20. Additionally, an explored or observed area or the floor is visualized as a sequence of polygons, providing the user 20 with information on what part(s) of the floor have been covered.

More specifically, the method and/or processing proposed herein first aligns a reference frame with the floor using the first few video frames captured by the camera 14, i.e., while the operator or user 20 initially stands in an area so that the camera 14 can see the floor and walls. Subsequently, frame-to-frame offsets are computed and/or otherwise determined from the continuous or nearly continuous RGB-D inputs obtained by the camera 14 as the operator or user 20 walks along the walls in the environment. From the data, a horizontal slice is selected at a certain height and a 2D floor plan is constructed using connected line segments, i.e., polylines. Along with the polyline representation for the floor plan, an explored area is represented by a sequence of polygons, which is computed from the resulting polyline map and the trajectory of the camera 14 obtained by frame-to-frame matching of the obtained video frames. The explored area polygons provide visual feedback and guidance to the operator/user 20. Accordingly, for example, the user 20 may decide to navigate an already-explored area to further improve mapping accuracy, or navigate to new areas to further grow the floor plan.

Figure 3:
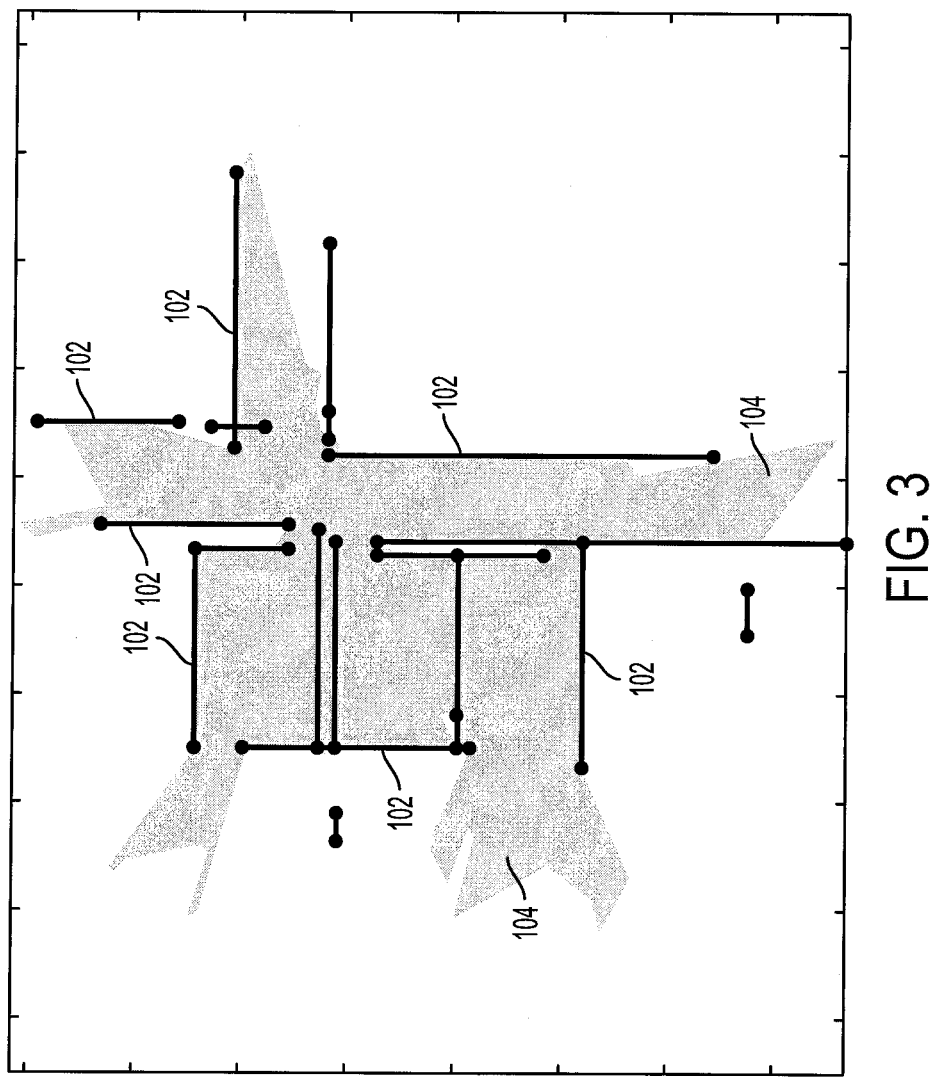
FIG. 3 is a diagrammatic illustration showing an exemplary 2D floor plan generated in accordance with aspects of the present inventive subject matter.

FIG. 3 shows an example of a multi-room 2D floor plan or map 100 created in accordance with an exemplary embodiment of the system 10 disclosed herein. As shown, the generated black polylines 102 represent detected walls and the like of the studied building floor (i.e., the polylines 102 generally define the 2D floor plan created), and the grey area(s) 104 represent(s) the explored region.

The use of polylines 102 to represent the floor plan or map is consistent with actual building floors that are generally defined by a collection of interconnected walls or wall segments. That is to say, the polylines 102 generally represent a floor plan or map using a set of interconnected linear segments, as would often be found in a conventional floor plan. Polyline maps are particularly advantageous because they can provide a compact and abstract representation and can be easily manipulated by the user 20 using an interactive interface, and they may also be used for indoor localization in ubiquitous applications. In the proposed method and/or processing described herein, lines or line segments are post-extracted from matched 3D point clouds of the current frame using both RGB and depth images, and grouped as polylines, i.e., a connected set of directional line segments. Polylines of the current frame are then merged with the previous polyline map to form a new partial map.

In one suitable embodiment, to reduce the effect of noise and increase the computation efficiency, orthogonality of the lines (i.e., representing walls) may be assumed for many indoor environments and/or building floors. The resulting rectification can greatly improve the quality of the resulting floor plan or map and can simplify computations for map merging.

Figure 4:
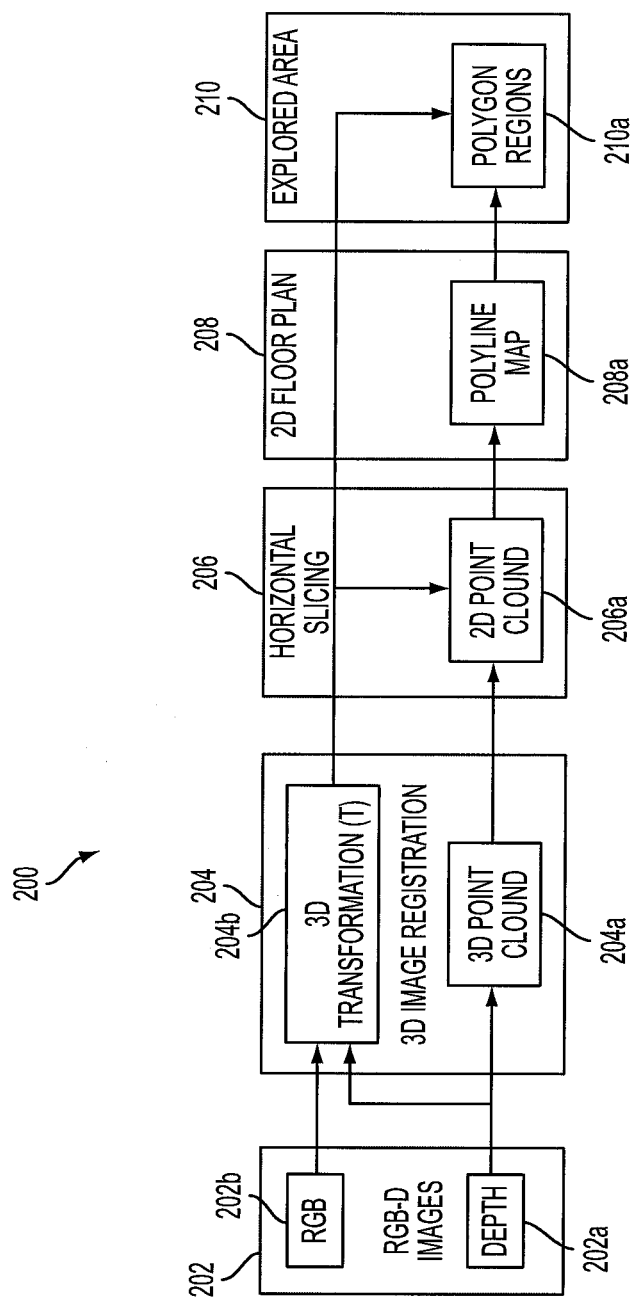
FIG. 4 is a flow chart illustrating an overview of an exemplary method for generating a 2D floor plan according to aspects of the present inventive subject matter.

Now there shall be described a method of and/or process for 3D image registration employed by an exemplary embodiment hereof, followed by a description of exemplary methods, processes and/or algorithms suitable for achieving the polyline map generation and explored area computation disclosed herein. FIG. 4 illustrates in general an exemplary process flow 200. As shown in box or step 202, the RGB-D images or video frames are capture or otherwise obtained by the camera 14 as input for the process. Box 202 shows the depth image and/or data 202a and RGB image and/or data 202b as separate inputs. At box 204, the RGB data 202a and depth data 202b are employed as input into a 3D image registration and/or modeling step or process. In particular, the depth data 202a is used to generate a 3D point cloud 204a; and both the RGB data 202b and the depth data 202a are employed as input to generate a 3D transformation 204b. At box 206, a horizontal slicing step or process is employed to select and/or generate a 2D point cloud 206a from the 3D point could 204a using the 3D transformation 204b. At box 208, the 2D floor plan is created by generating a polyline map 208a (shown as polylines 102 in FIG. 3) from the 2D point cloud 206a. Finally, as shown in box 210, the explored area is created by defining one or more polygon regions 210a (shown as the grey area 104 in FIG. 3) based on the polyline map 208a and the 3D transformation 204b.

I. Obtain Camera Trajectory from RGB-D Images

Suitably, the 3D registration and modeling or mapping employed herein in accordance with one exemplary embodiment can be generally described in terms of three steps or sub-processes, referred to herein as: "preprocessing," "local matching" and "global matching." In practice, the preprocessing involves RGB-D image un-distortion and alignment, and 3D point cloud down-sampling; the local matching is applied to two consecutive video frames and finds a consistent offset between them; and the global matching seeks to improve alignment accuracy by registering two key frames obtained relatively far apart in time yet sharing similar image content. For example, the reoccurrence of image content may be due to revisits, for instance, when the camera 14 returns to a position that it has viewed before. In this case, a matching pair of key frames is detected, and an error distribution method can be applied to improve the 3D registration results. Ultimately, a loop closure may be suitably performed to generate a globally consistent map.

A. Preprocessing

Figure 5:
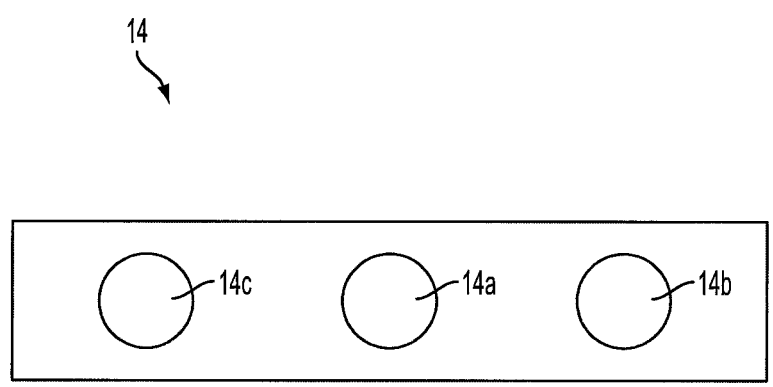
FIG. 5 is a diagrammatic illustration showing an exemplary camera suitable for use in the system illustrated in FIG. 1.

As shown in FIG. 5, the camera 14 may include an RGB camera 14a, an infrared (IR) camera 14b, and an IR projector 14c. In practice, distortion from the camera's sensors may not be negligible. Accordingly, a suitable method or process is optionally implemented in such circumstances to calibrate the cameras and use the calibration result to un-distort both the RGB images and depth images. Then the following alignment method may be applied to align the RGB image with the depth image: Suitably, the stereo configuration provides the relative pose between the RGB camera 14a and the IR camera 14b so that mapping a point in the depth image to the RGB image is straightforward. Nevertheless, mapping a point in the RGB image back to the depth image can involve costly search operations. To avoid this complication, for every point in the depth image, the corresponding location is found in the RGB image and its RGB value is calculated and/or otherwise determined by interpolation, i.e., for each point in the depth image, the RGB corresponding values are obtained from the RGB image, and a combination thereof results in a RGB-D image pair.

Suitably, the depth image is obtained by correlating an image obtained from the IR camera 14b with a pattern projected from the IR projector 14c. In practice, the correlation procedure may be less than optimal, especially in viewed regions with significant depth discontinuity. In particular, suppose two adjacent points seen by the camera 14 are from two different surfaces, instead of an abrupt depth jump, it can look like there is another plane connecting the two points. In other words, the 3D space may look smoother than it actually is. This artifact can be detrimental to the subsequent matching sub-processes. As such, in one suitable embodiment, those "fake" depths are identified and removed, e.g., whose points lie substantially collinear with an optical center of the IR camera 14b.

In practice, the original RGB-D images or video frames from the camera 14 can be in a resolution as high as approximately 640×480 pixels, or, more than approximately 300,000 points. Computationally, it can be challenging to perform frame-to-frame matching using an algorithm, e.g., such as an iterative closest point (ICP) algorithm, on this many point samples in a real-time or near real-time system. Accordingly, in one suitable embodiment, down-sampling is employed on the images or video frames obtained by the camera 14. Optionally, in order to have better accuracy for the subsequent matching sub-processes, instead of down-sampling points uniformly in the image coordinate, the points may be down-sampled according to the depth of the points. For example, points within some defined valid range of the camera 14 (e.g., approximately 0.8 m to approximately 5 m) are down-sampled less (and hence denser samples survive) compared to points out of this range. Indeed, points within the valid range are deemed more accurate for frame matching purposes. In practice, the window size of a down-sample grid suitably varies with the depth of the points. Each down-sampled point is assigned a depth value based on the average of the depth values within the window of the down-sample grid. Down-sampling rates may vary from frame-to-frame. Suitably, after down-sampling, approximately 1,000 to approximately 20,000 points remain for application of an ICP algorithm and 2D polyline extraction.

B. Local Matching

Figure 6:
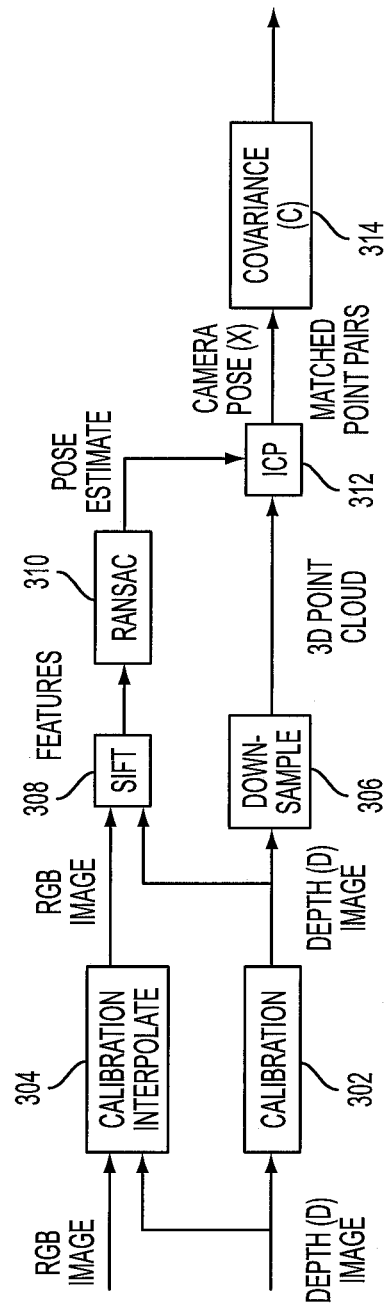
FIG. 6 is a flow chart illustrating exemplary preprocessing and local matching sub-procedures employed in accordance with aspects of the present inventive subject matter.

The local matching sub-process is suitably employed following the preprocessing sub-procedure to align adjacent video frames obtained by the camera 14. FIG. 6 shows an overall flowchart of the preprocessing and local matching sub-procedures. The resulting output of this is a 6D (six dimensional) camera pose X=(x, y, z, α, β, γ) and/or its 3D transformation T for the current frame, and a 3D covariance error matrix C for the translation part of the pose estimation, reflecting the uncertainty.

As shown, boxes 302, 304 and 306 correspond to the pre-processing sub-procedure, while the remaining boxes correspond to the local matching sub-process. In particular, at box 302 the depth data or image (D) from the camera 14 is calibrated. At box 304, the calibration and interpolation is performed on the RGB image data, e.g., using the depth (D) image data. At step 306, the depth image data is down-sampled to produce a down sampled 3D point cloud. At step 308, the RGB and depth image data are subject to a scale invariant feature transform (SIFT) to identify consistent features in adjacent video frames. The features identified by the SIFT performed in step 308 are then matched at step 310, e.g., using a modified random sample consensus (RANSAC) algorithm to generate a camera pose estimate. Using the camera pose estimate from step 310 and the down sampled 3D point cloud from step 306, an IPC step 312 produces the camera pose X and matched point pairs, from which the covariance (C) may be calculated, e.g., at step 314.

In one suitable embodiment, the local matching sub-process begins by extracting features from the two RGB images or video frames being aligned, e.g., by using scale invariant feature transform (SIFT) descriptors. SIFT identifies a set of key-points based on local image features that are consistent, e.g., under illumination conditions, viewing position, and scale. The SIFT features are generally distinctive and therefore can be used for image matching. Suitably, the SIFT features between adjacent frames are matched using random sample consensus (RANSAC), an algorithm that iteratively estimates model parameters from a data set containing inliers and outliers. In practice, a model is fitted using inliers and then other data are tested against the model fitted and classified again into inliers and outliers. In practice, the model with the most inliers is chosen. However, SIFT and RANSAC can be error-prone in indoor environments. For instance, repetitive patterns such as patterns on carpet and wallpaper can result in ambiguities in matching. To account for repetitive patterns in the indoor environment, in accordance with one exemplary embodiment, the traditional RANSAC has been modified to be a maximum likelihood algorithm. Specifically, it is assumed that the speed of the movement of the camera 14 is generally constant with some Gaussian noise, i.e., if $X_k$ is the pose of frame k, $$X_{k+1} - X_k = X_k - X_{k-1} + \Delta X \quad (1)$$

where ΔX are random noise with Gaussian distribution. Letting the matching score for pose X be m(X), instead of choosing $\arg_X \max m(X)$, $\arg_X \max[m(X)p(X==X')]$ where X' is the predicted pose for this frame according to equation 1. In other words, prior knowledge regarding the continuity of motion is used to eliminate ambiguities in the local frame matching.

Using RANSAC as described above, the best camera rotation and translation between the two SIFT feature sets is found. While this tends to give a good initial estimate, it may not be accurate enough. Accordingly, an ICP algorithm is then used to refine the estimation. In general, the ICP algorithm iteratively matches points in a source cloud with their nearest neighbors in a target cloud and a rigid transformation is estimated by minimizing errors between the matched pairs. The foregoing process can be iterated until a sufficient convergence is achieved. Because of the partial overlap between adjacent video frames, it is possible to focus only on point pairs within the intersection. For example, there are several variants of ICP algorithms which may be suitable. Some generalized ICP algorithms may provide better results but at a cost. In one suitable embodiment, a so-called point to plane version is employed and appears to work well. In practice, the down-sampled 3D point clouds of two neighboring frames are used for the local marching, starting from the initial estimate obtained by employing RANSAC. The output obtained by application of the ICP algorithm is the final pose estimate and a set of matched points.

While the 3D transformation between frames is the target result for the local matching computation, it is also useful to keep track of the uncertainty in the estimation process. In the following global matching stage (i.e., the next sub-process applied), loops will be detected between far apart frames. When a loop is detected, the cumulative error between two ends of the loop can be significant. Accordingly, to make the two ends meet, the cumulative error is distributed to individual frames. This improves the overall mapping accuracy. The uncertainty in the local matching stage provides an intuitive guideline to how the error should be distributed.

In one suitable embodiment, the uncertainty of the pose estimation is represented by its covariance matrix. Given the matched point pairs $p_j$ and $p'_j$, suppose $p_j$ is in the first frame, a local tangent plane with the k nearest neighbors is approximated by principle component analysis (PCA). The PCA gives the normal direction $n_1$ and two other basis vector $n_2$, $n_3$ in the tangent plane. By employing the point to plane version of the ICP algorithm, points can slide arbitrarily in the tangent plane. As a result, it is difficult to have confidence how well $p_j$ matches $p'_j$ in the tangent plane. However, the distance between two local tangent planes provides a quality measure along the normal direction. As such, the covariance matrix of the match between $p_j$ and $p'_j$ is calculated as follows. Let the distances of the k-nearest neighbors of to the tangent plane of $p'_j$ be of $d_i$, i=1, ..., k, the average of $d_i^2$ is taken as the variance $\sigma_j^2$ in the direction of $n_1$. To bring the covariance matrix to the coordinate system of this frame, a rotation matrix $R_j$ from PCA is applied.

$$C_j = R_j \begin{pmatrix} \sigma_j^2 & 0 & 0 \\ 0 & \infty & 0 \\ 0 & 0 & \infty \end{pmatrix} R_j^T \quad (2)$$

where $R_j = [n_1, n_2, n_3]$ is the rotational matrix for the plane. To obtain the covariance matrix of the pose estimation between the two adjacent frames, the average of $C_j$ of all matched pairs is taken. In practice, the harmonic mean of $C_j$ is used, as the standard arithmetic average is difficult at best due to the ∞ entry in $C_j$. Accordingly, the covariance matrix between the matched frames can be expressed as:

$$C = \frac{n}{\sum_j C_j^{-1}} \quad (3)$$

where n is the total number of matching points between the two frames and $$C_j^{-1} = R_j \begin{pmatrix} \sigma_j^{-2} & 0 & 0 \\ 0 & 0 & 0 \\ 0 & 0 & 0 \end{pmatrix} R_j^T.$$

C. Global Matching

Figure 7:
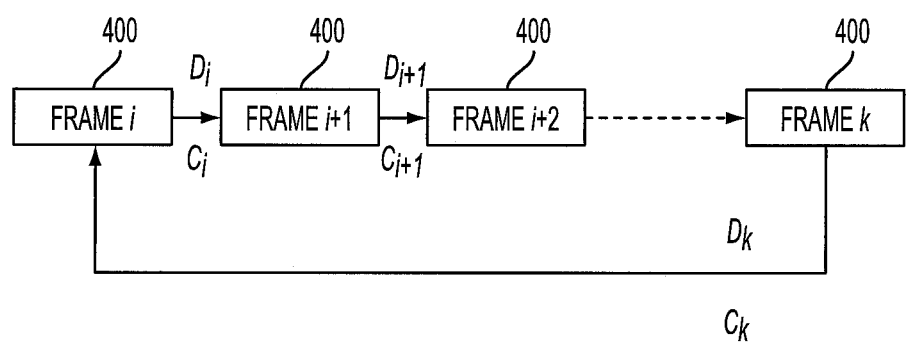
FIG. 7 is a diagram showing a closed loop of video frames used to illustrate aspects of a global matching sub-process employed in accordance with aspect of the present inventive subject matter.

Due to imprecise pose estimation, over time, error can accumulate, which can causes the estimation of the camera position to drift over time. This in turn can lead to inaccuracies in the mapping. For example, this effect can be particularly noticeable when the camera 14 moves over a long path, and eventually returns to a location previously visited. To address this issue, in accordance with one suitable embodiment, a global optimization is employed, referred to herein as global matching. For example, it is possible to represent constraints between video frames with a graph structure, and if a loop is detected, it is represented as constraints between frames that are not adjacent. For example, FIG. 7 shows a loop of frames 400, from frame k back to frame i.

Suitably, the applied global matching sub-process is executed in two-steps, referred to herein as: (i) key frame identification; and (ii) loop identification and closure.

Key frame identification: this step involves the identification of key frames. Let the first frame be a key frame $F_0$. At each time after local matching with the previous frame, it is also check if this frame can be matched the previous key frame $F_{i-1}$. If it matches, then the process continues on to the next frame, if not, the current frame is set to the next key frame $F_i$. The covariance matrix between $F_{i-1}$ and $F_i$ is computed using $C_j$ between the two frames and all the frames between the two may be thrown away to save storage.

Loop identification and closure: after a new key frame $F_k$ is identified, it is check if this key frame matches any previous key frames $F_{k-1}, \ldots, F0$. If a match is identified from $F_k$ to $F_i$, loop closure is performed on the identified loop.

In practice, the full six degree constraint is generally non-linear, and optimization based thereon can be expensive. Accordingly, in one exemplary embodiment, instead of doing a general optimization, a simple strategy is used to do the optimization for the rotational part and the translation part separately. For mapping applications of the type described herein, e.g., in which most images are walls or rectilinear objects, the main error source tends to come from the ambiguity in the uncertainty in translations, due to the lack of features, either visually or geometrically. The rotational part is generally much less noisy than the translation part. Accordingly, in one suitable embodiment, the rotational error is simply distributed among the frames evenly to close the loop of rotational offset. In particular, assume the rotation matrix from key frame i to key frame k is R, which can be transformed into a quaternion $q=(q_0, q_x, q_y, q_z)$, with the rotation axis $a=(q_x, q_y, q_z)/\sqrt{1-q_0^2}$ and the rotation angle $\theta=2 \arccos q_0$. $R_j$, $i<j<k$, is obtained by setting the angle offset $\theta/(k-i)$, along the axis a, between any two consecutive key frames in the loop.

Suitably, instead of evenly distributing the translation error along the frames in the loop, the error is spread according to their covariance matrix, computed in the local matching stage (described above). Specifically, if the translational offset from frame j to j+1 is $D_j$ with covariance matrix $C_j$, and from frame k to frame i is $D_k$ with the covariance matrix $C_k$ (see FIG. 7), this can be achieved by simply minimizing the following energy function:

$$W = \sum_{j=1}^{k-1} (X_{j+1} - X_j - D)^T C_j^{-1} (X_{j+1} - X_j - D_j) + (X_i - X_k - D_k)^T C_k^{-1} (X_i - X_k - D_k)$$

where X is the translation of the frame j. It turns out that this is a linear optimization and $X_j$, $i<j\le k$, can be obtained by a simple matrix inversion.

The 3D transformation T of the current frame is obtained by combining the rotation matrix R and the translation X. The sequence of transformations $\{T_0, T_1, T_2, \ldots\}$ of the key frames represents the trajectory of the camera poses. In turn, the 3D trajectory is used to compute 2D polyline maps for floor plans.

II. Generate Polylines from Camera Trajectory

Given the transformation of a current key frame T, and the set of 3D points $P_c$ in the current camera frame, a subset of points is obtained (i.e., a horizontal slice) corresponding to a plane at height h, i.e., $P_h=\{p \in P_c: |y(T \cdot p)-h|<\epsilon\}$ where y(p) is the y value of a 3D point p. Suitably, line segments are then extract and rectify in $P_h$. The newly generated set of line segments are in turn merged with a partial map obtained from the previous key frames to form a new updated partial map. It is in this manner that the map is grown. Using line segments and/or polylines to represent the 2D floor plan or map provides convenience to the operator/user 20—people are generally more comfortable with line drawings, e.g., as compared to an occupancy grid and/or point cloud, and as such a 2D floor plan representation is already understandable and more in keeping with user expectations. Additionally, the line segments and/or polylines are also concise, and hence efficient in terms of memory and computation.

A. Segmentation

Having generated a 2D point cloud, any of a number of methods may be used for line extraction. In one suitable embodiment, a simple method is used that applies to an ordered set of points. Segmentation on an ordered set of points is much more efficient than that on an order-less set of points. Given the set of points in a horizontal plane $P_h$ from the current camera frame, the points are ordered by a viewing angle in the x-z plane, i.e., $p1<p2$ if and only if $x(p_1)/z(p_1)<x(p_2)/z(p_2)$. By letting $P_o$ be the ordered set of points $P_h$ in the reference frame, i.e., $P_o=\{T \cdot p: p \in P_h\}$, one obtains an ordered set of 2D points P in the reference frame by projecting $P_o$ to the x-z plane in the reference frame.

Given the set of ordered points P in the 2D plane, the next step is to obtain a set of polyline segments. For this operation, two consecutive points are deemed to belong to the same polyline segment if and only if the representative distance between them is smaller than a given threshold, e.g., 0.3 meters. In practice, the goal of linearization is to generate line segments, which are the primitives used in construction of the map. Suitably, a balance is struck between two considerations: on one hand, a line segment is preferred to be long to give a concise representation; while on the other hand, a line segment should have a small linearization error in order to maintain high accuracy. In one suitable embodiment, the following described two part algorithm is used to strike a suitable balance.

Figure 8:
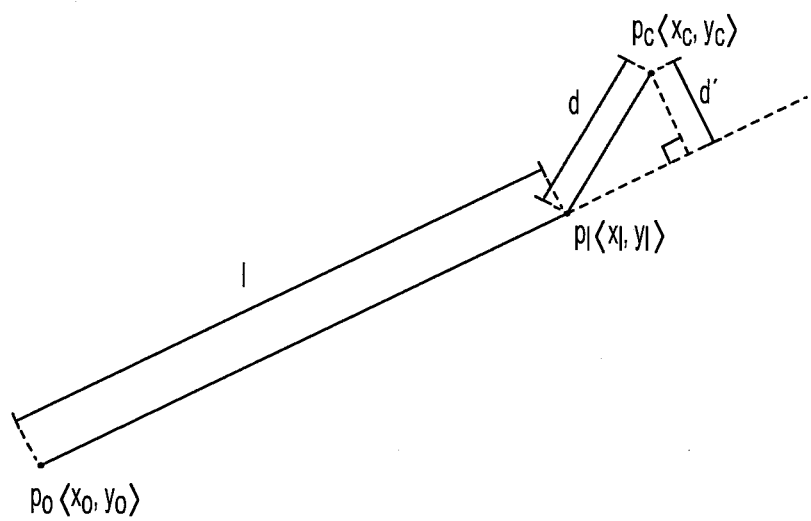
FIG. 8 is a diagram showing line segments extracted from a 2D point cloud used to illustrate aspects of a linearization algorithm in accordance with aspects of the present inventive subject matter.

Linearize: Starting from a first point in the polyline segment, for each point in the segment in the sequence, the line segment is extended as follows. Let $$p_0 = \langle x_0, y_0 \rangle$$

be the first point in the line segment, and $$p_l = \langle x_l, y_l \rangle$$

be the previous point and $$p_c = \langle x_c, y_c \rangle$$

be the current point. Let the distance between $p_0$ and $p_l$ be l, the distance between $p_l$ and $p_c$ be d and the distance from $p_c$ to the line $p_0$-$p_1$ be $d_0$ (see FIG. 8). The line $p_0$-$p_l$ is extended to $p_0$-$p_c$, if and only if, $l<l_{min}$ or $d=d'<K$, where $l_{min}$ is a minimum representative length of a line and K is a constant such that $0<K<1$. For example, $l_{min}$ may be 0.3 meters and K may be 0.1. If $p_c$ extends the line segment, we have $p_l \leftarrow p_c$ and continue. If $p_c$ does not extend the current line, a new line is started with $p_0 \leftarrow p_l$ and $p_l \leftarrow p_c$ and so on.

Figure 9:
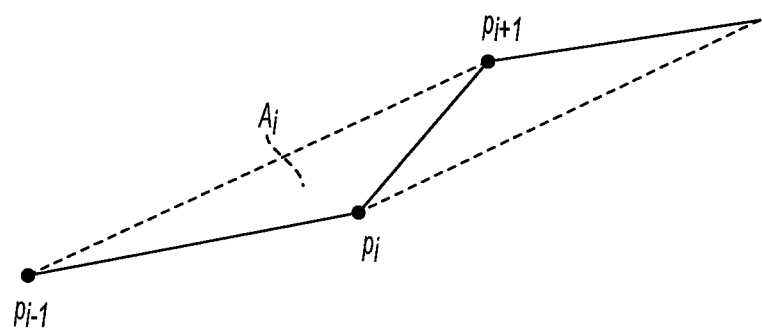
FIG. 9 is a diagram showing line segments extracts from a 2D point cloud used to illustration aspects of a clustering algorithm in accordance with aspects of the present inventive subject matter.

Cluster: Given a sequence of line segments after linearization, we compute the triangular areas formed by two consecutive lines. Let $A_i$ be the area formed by $(p_{i-1}, p_i)$ and $(p_i, p_{i+1})$ (see FIG. 9). The two lines can be merged into a new line $(p_{i-1}, p_{i+1})$ if and only if: (1) $A_i = \min_j A_j$, i.e., $A_i$ is the smallest among all other areas $A_j$ formed by two lines at j: and (2) $A_i < A_{min}$, i.e., it is smaller than the minimum size, e.g., $A_{min} = 0.1$ square meters and/or is approximately representative thereof. Suitably, the algorithm iterates until all areas are larger than $A_{min}$ or there is only one line left in the polyline segment.

After segmentation, a set of polyline segments is obtain from the current 2D point cloud, which in turn generally represents wall segments of the build floor in the 2D floor plan or map.

B. Rectification

In one exemplary embodiment, it is assumed that most wall segments in indoor environments are rectilinear. Suitably, when moving the camera 14 about the floor being studied, the camera 14 is positioned such that it will target at walls most of the times. Notably, the rectilinear assumption greatly reduces computations for map merging.

Suitably, the user 20 is sure to initially aim the camera 14 at walls of the floor being studied, and the statistical distribution of the directions of line segments is initially used to compute the orientation of the walls using the first few video frames. Given the initially determined direction and/or orientation of the walls, all line segments of the future frames are then rectified thereto. In one suitable embodiment, this is achieved as follows.

Initial Orientation: Let $L = \{(l_i, \alpha_i): i \in 1 \ldots N_g\}$ be the set of N line segments where $l_i$ is the length and $-\pi < \alpha_i \leq \pi$ is the angle of the ith segment, respectively. The wall direction is computed as $\alpha = \arctan(s, c)/4$, where $s = \Sigma_i w_i \sin(4\alpha_i)$, $c = \Sigma_i w_i \cos(4\alpha_i)$ and $$w_i = \frac{1}{\sum_j l_j}.$$

In other words, the wall direction $\alpha \in (-\pi/4, \pi/4]$ is the weighted average of the normalized directions in $(-\pi/4, \pi/4]$ of all line segments in this frame. To verify if this frame consists of mostly wall segments, a variance is computed as $\sigma_s^2 = \Sigma w_i(\sin(4\alpha_i) - \sin(4\alpha))^2$ and $\sigma_c^2 = \Sigma w_i(\cos(4\alpha_i) - \cos(4\alpha))^2$. If there is a large $\sigma_s$ or $\pi_c$, then there is either a noisy frame or the wall segments are not rectilinear. Accordingly, first few frames are used to compute the wall orientation and value $\alpha$ that has minimum uncertainty, i.e., the smallest variances, is used as the result.

Rectification: To make sure that the frame consists of mostly wall segments, the wall orientation is computed for each frame. If the orientation differs a large amount from the wall orientation $\alpha$, the frame will not be used for map merging; otherwise, the current frame is rotated by $-\alpha$ to align with the walls. The set of line segments in the rotated frame is then rectified to one of the rectilinear angles, $\{0, \pi/2, \pi, -\pi/2\}$, that is closest to its direction.

The result of rectification is a set of rectified polyline segments. Next, the set of polyline segments from a given frame is merged with the partial 2D floor plan sketch and/or map generated by the previous frames to form a new and/or updated 2D floor plan sketch or map. In this way, the 2D floor plan is iteratively grown. In practice, in cases where many diagonal or circular walls are present, the presently described rectification can be extended to eight or more directions instead of four. Nevertheless, for the purposes of clarity and simplicity herein, the present specification focuses only on rectilinear walls.

C. Map Merging

A polyline map is represented by a set of polylines. Suitably, instead of merging two polyline maps together in their entirety, the polyline maps are first decomposed into four groups of line segments, each in one of the directions $\{0, \pi/2, \pi, -\pi/2\}$. Lines that are overlapping in the same direction are then merged. Finally, the sketch map is cleaned-up by removing small segments and the polyline map is recreated from the merged sketch map. In one suitable embodiment, the follow approach is employed.

Figure 10:
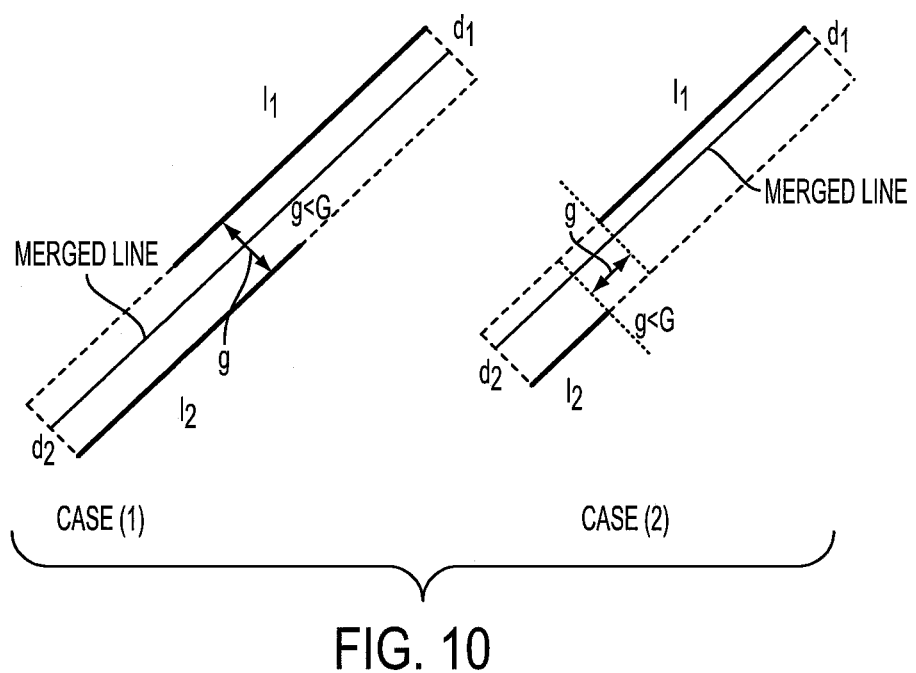
FIG. 10 is a diagram showing line segments extracted from a 2D point cloud used to illustrate aspects of a line merging operation in accordance with aspects of the present inventive subject matter.
Figure 11:
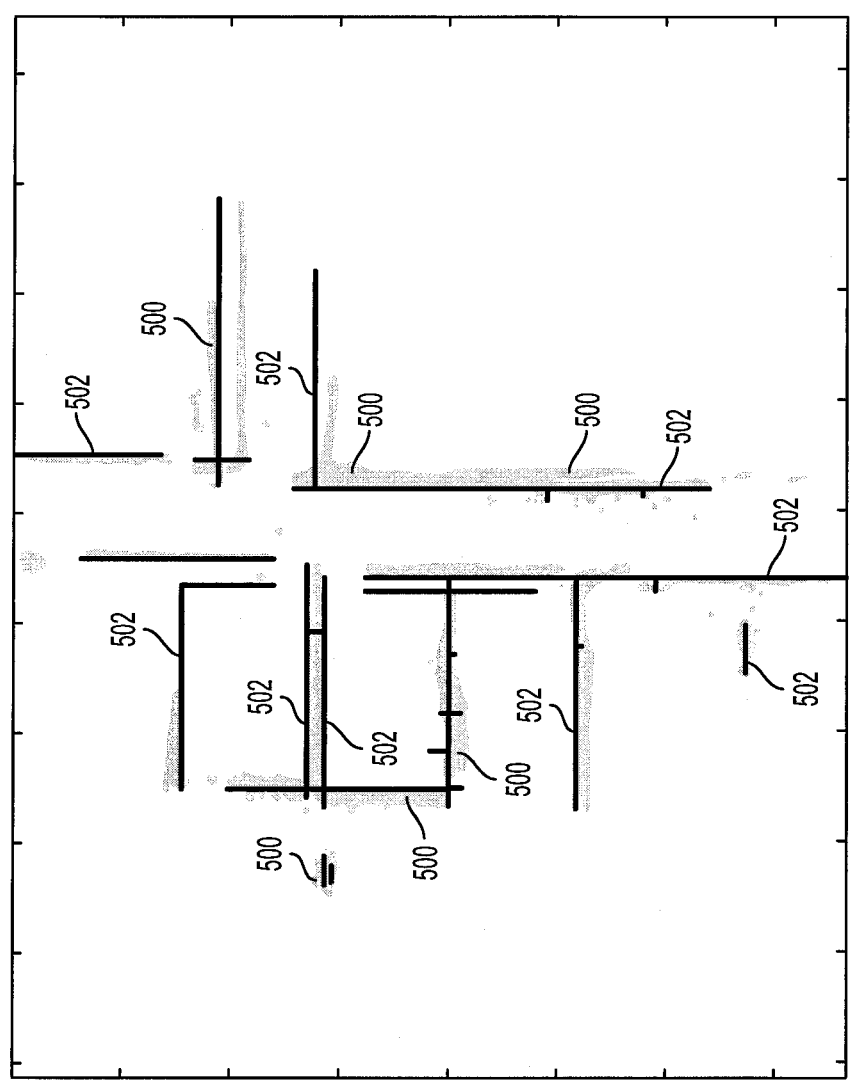
FIG. 11 is a diagrammatic illustration showing an exemplary sketch map generated in accordance with aspects of the present inventive subject matter.

Sketch merging: For each of the four directions, the merging of two overlapping lines is suitably repeated until no lines are overlapping. For this purpose, two lines are deemed overlapping, if and only if, (1) a vertical gap (g) between the two lines is less than G, and (2) either the lines are overlapping or a horizontal gap (g) between the lines is less than G. In one suitable example, G may represent 0.2 meters. Given $l_1$ and $l_2$ as the lengths of two overlapping lines in the same direction, the merged line 1 is parallel to the two lines with the two ends at the boundary of the rectangular box formed by these two lines (see FIG. 10). Let $d_1$ and $d_2$ be the distances from the merged line to $l_1$ and $l_2$ respectively, then $d_1 l_1 = d_2 l_2$. In other words, the merged line is closer to the longer line. FIG. 11 shows an example of a sketch map generated out of the 2D point cloud (represented by the grey dots 500). The black lines 502 represent the merged lines.

Figure 12:
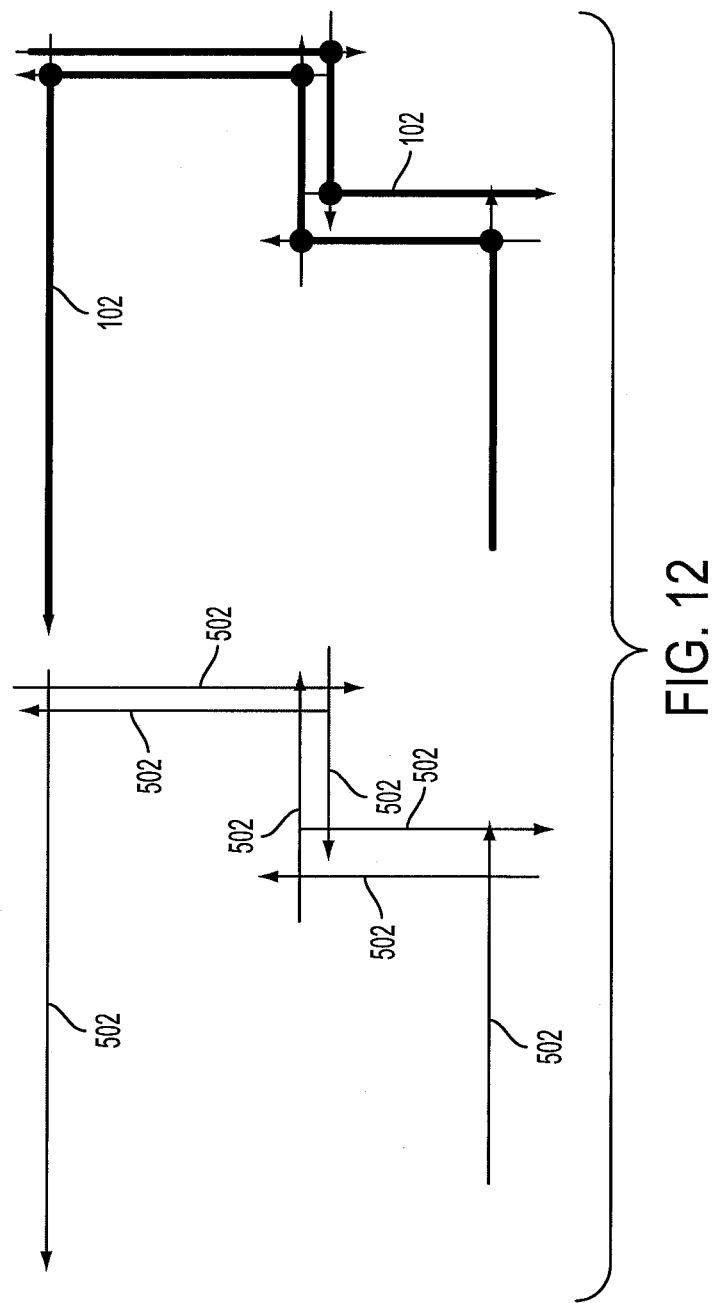
FIG. 12 is a diagram showing intersecting line segments and exemplary resulting polylines illustrating aspects of a polyline extraction process employed in conjunction with aspects of the present inventive subject matter.
Figure 13:
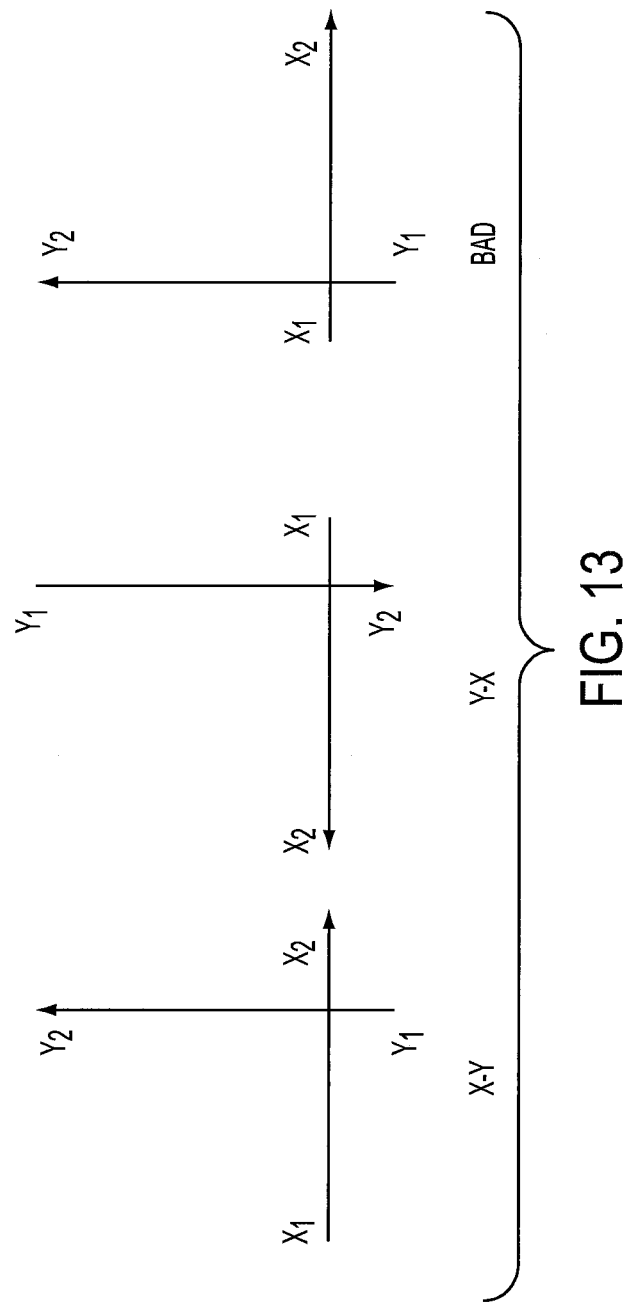
FIG. 13 is a diagram showing examples of intersection identified in accordance with aspects of the present inventive subject matter.

Intersection identification: Due to noise in the images and approximations in processing, the sketches may tend to have lines crossing each other in different directions. FIG. 12, for example, shows on the left hand side, a collection of merged lines 502 in a sketch crossing one another in different directions. For comparisons sake, the right hand side of FIG. 12 shows the same configuration of merged lines, with correspondent polylines 102 (shown in relatively heavier and/or darker lines) superimposed over the merged lines. Accordingly, there are identified three types of intersects, a X-Y intersect, a Y-X intersect and a so-called bad or invalid intersects (see FIG. 13), where the X-Y intersections start from an X-line and end at a Y-line, Y-X intersections start at a Y-line and end at an X-line, and bad intersections are invalid, e.g., resulting from noisy images and/or misalignments in trajectory matching. In particular, an intersection type is X-Y if and only if $x_2 < \epsilon$ and $y_1 < \epsilon$, it is Y-X if and only if $x_1 < \epsilon$ and $y_2 < \epsilon$. Otherwise, the intersection is deemed invalid or bad. By so identifying the bad intersects, the user 20 can adjust the map afterwards.

Polyline extraction: Start from any valid intersect P of lines $l_x$ and $l_y$—without loss of generality, assume for the sake of illustration the intersect is of type X-Y—a forward search is conducted as follows. An intersect P' of $l'_x$ and $l'_y$ follows P, if and only if, P' is of opposite type, i.e., Y-X, $l'_y = l'_y$, and P' is the first intersect along the direction of Y. Similarly, a backward search is conducted to find P" of $l''_x$ and $l''_y$, which precedes P, if and only if, P" is of type Y-X, $l''_x = l_x$, and P" is the first intersect along the opposite direction of X. In practice, all the intersects used in this search are marked and a polyline of all the intersects in the chain is created. The process is iterated and/or continues until no more valid intersects exist. All unused lines, which do not have any intersects with other lines, are then added back. The result of this process produces a set of polyline segments which is viewed as a partial map at the time (see, e.g., the right hand side of FIG. 12). Note, the corresponding polyline map of the sketch map shown in FIG. 11 is shown in FIG. 3.

In one suitable implementation, both the partial sketch map (FIG. 11) and the partial polyline map (FIG. 3) may be maintained, e.g., in memory 32, so that the sketch map can be merged with the new sketch produced from frame-to-frame and the polyline map can be viewed in real-time or near real-time, e.g., on the screen 42.

III. Obtain Explored Area from Map and Trajectory

As used herein, an explored area refers to the area swiped by a sensor or the camera 14 of the system 10 along its motion trajectory. For example, in exploration or search and rescue situations, it can be useful to obtain and/or mark the explored area so that it is more efficient to discover the spaces unexplored. Accordingly, in one suitable embodiment, a "viewing" polygon is computer from the created polyline map and the camera's position and orientation. The explored area is then obtained by taking a sequence of viewing polygons along the trajectory.

Figure 14:
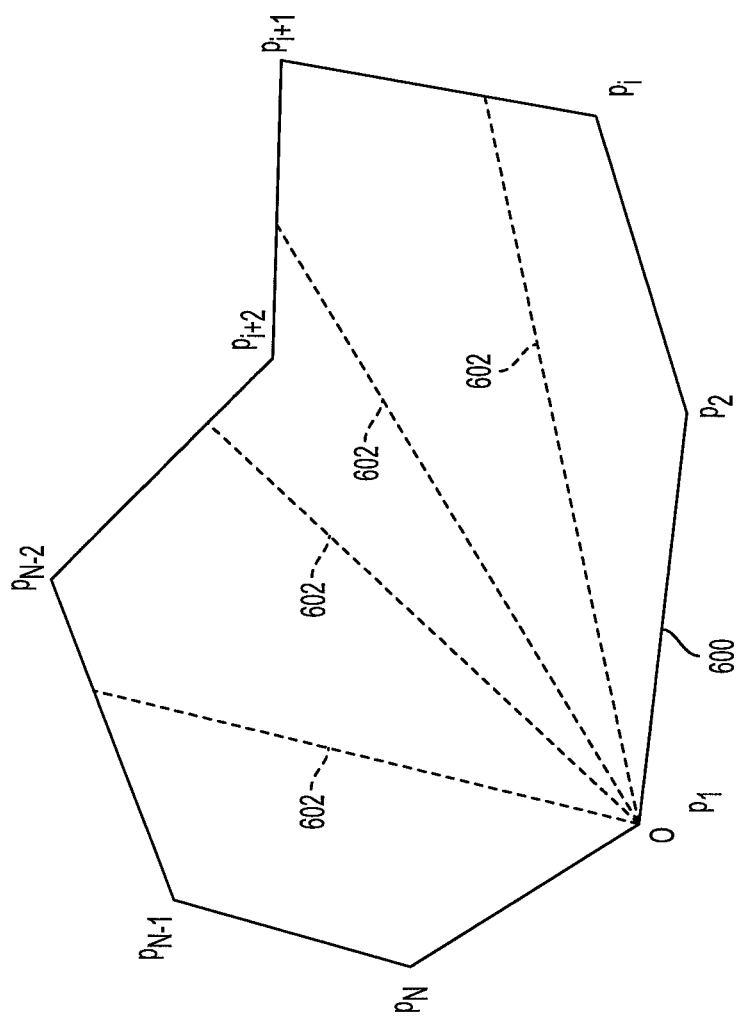
FIG. 14 is a diagram showing an exemplary viewing polygon employed in accordance with aspects of the present inventive subject matter.
Figure 15:
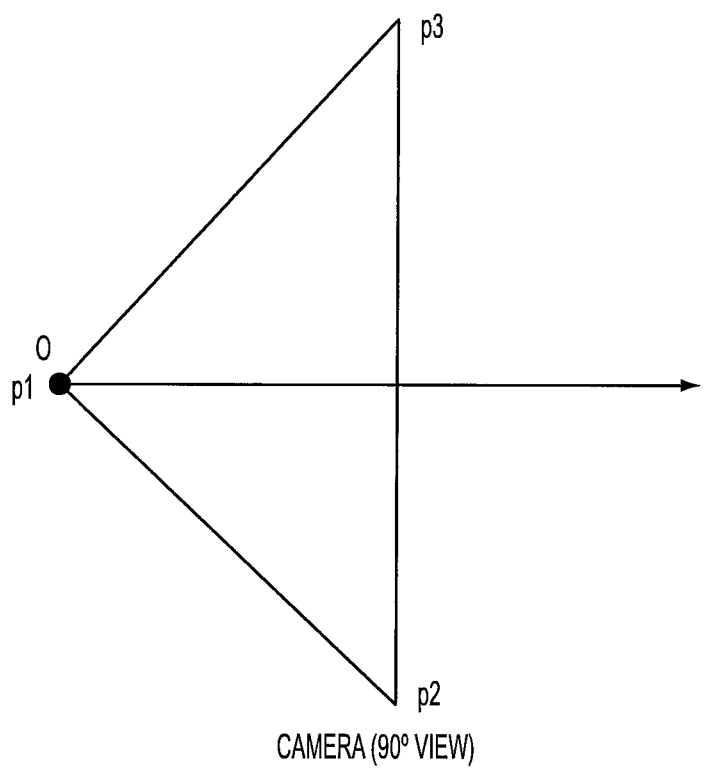
FIG. 15 is a diagram showing an exemplary viewing polygon produced by a suitable camera employed in the system of FIG. 1.

With reference now to FIG. 14, in practice, a viewing polygon may be defined by a polygon 600, such that, (1) there is an origin point O, and (2) there is only one intersection for any line (e.g., such as lines 602) from the origin towards any edge of the polygon. Any line from the origin may be referred to as a viewing line 602. A viewing polygon will be represented by a sequence of points, e.g., $P_1 \ldots P_N$, starting from the origin. Note that viewing polygons are generally not convex. In practice, a view of a directional sensor, e.g., such as the camera 14, can be approximated by a viewing polygon such as the one shown in FIG. 15. Given an initial viewing polygon of a sensor or the camera 14, the viewing polygon is clipped by the lines in the polyline map that intersect with it and a new viewing polygon is obtained that is not blocked by any line.

Given any line that intersects with the viewing polygon, there are three cases (e.g., as shown in FIG. 16): case (1) both ends are inside the polygon; case (2) one end is inside and one end is outside; and case (3) both ends are outside. For each inside-end, the intersection of the viewing line extended from the inside-end to one of the edges of the polygon is computed. For the outside-ends, the intersection of the line with one of the edges of the polygon is computed. Suitably, all the boundary intersections and inside-ends are order in an increasing order of the viewing angles. Let the initial viewing polygon $P=(P_1, P_2, \ldots, P_N)$ be the ordered set of N points starting from the origin. The index of a boundary intersection point is k if the point is between $P_k$ and $P_{k+1}$. A new viewing polygon cut by a line is obtained as follows:

Both ends inside: in this case, there are zero or an even number of intersections of this line with the polygon. Let $I_1$ and $I_2$ be the two inside-ends of the line and $B_1$ and $B_2$ are the correspondent boundary points. Let the index of $B_1$ be k and $B_2$ be j, $k \leq j$. If there are zero intersections (as shown in case (1) of FIG. 16), the new polygon would be $\{P(1:k), B_1, I_1, I_2, B_2, P(j+1:N)\}$. If there are an even number of intersections, additional boundary points are inserted and the original points that are outside of the line are removed. In other words, let $\{i_1, i_2, \ldots, i_{2n}\}$ be the indexes of the intersection points in order. The points between $i_{2k-1}$ and $i_{2k}$ remain in the new polygon, but the points between $i_{2k}$ and $i_{2k+1}$ are outside of the new polygon.

One end inside and one end outside: in this case, there is one or an odd number of intersections of this line with the polygon. Without loss of generality, assume for the sake of illustration that the inside-end I is before the outside-end, i.e., $B_1$ has index k and $B_2$ has index j, $k \leq j$. If there is only one intersection, $B_2$, the new polygon is $\{P(1:k), B_1, I, B_2, P(j+1:N)\}$. If there are more than one intersections, i.e., $\{i_1, i_2, \ldots, i_{2n+1}\}$, similar to the previous case, the points between $i_{2k-1}$ and $i_{2k}$ remain in the new polygon, but the points between $i_{2k}$ and $i_{2k+1}$ are outside of the new polygon.

Both ends outside: in this case, there are two or an even number of intersections of this line with the polygon. Let $B_1$ and $B_2$ be the two intersection points of the line and the polygon. Let the index of $B_1$ be k and $B_2$ be j, $k \leq j$. If these are the only two intersections (as shown in case (3) of FIG. 16), the new polygon would be $\{P(1:k), B_1, B_2, P(j+1:N)\}$. If there are more than two intersections, additional boundary points are inserted and the original points that are outside of the line are removed. That is to say, let $\{i_1, i_2, \ldots, i_{2n}\}$ be the indexes of the intersection points in order. The points between $i_{2k-1}$ and $i_{2k}$ are outside of the new polygon, but the points between $i_{2k}$ and $i_{2k+1}$ remain in the new polygon.

To compute a viewing polygon for a camera pose, the original viewing polygon (see FIG. 15) is appropriately cut by each of the lines that intersect with it in the current polyline map. Suitably, viewing polygons are computed only when the camera 14 has moved significantly since the last time a polygon was computed. To calculate the difference between two frames, in one suitable embodiment, the following equation is use:

$$d = \lambda \|x - x'\|^2 / D^2 + (1-\lambda)\sin^2(\alpha - \alpha') \qquad (4)$$

where x and $\alpha$ (x' and $\alpha'$) are the 2D location and heading of the current (previous) frame, respectively. In one suitable example, D may be set to represent approximately 5 meters, $\lambda$ is 0.5 and d>0.1 triggers a new polygon computation. Accordingly, a sequence of viewing polygons forms the explored region viewed by the camera 14. For the example, in FIG. 3, one may have 1000+ key frames, but only 70+ polygons for representing the explored space 104.

In any event, the above elements, components, processes, methods, apparatus and/or systems have been described with respect to particular embodiments. It is to be appreciated, however, that certain modifications and/or alteration are also contemplated.

It is to be appreciated that in connection with the particular exemplary embodiment(s) presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, analysis, methods, functions, elements and/or components described herein may suitably be implemented via hardware, software, firmware or a combination thereof. For example, the computer 30 and/or handheld device 40 may include a processor, e.g., embodied by a computing or other electronic data processing device, that is configured and/or otherwise provisioned to perform one or more of the tasks, steps, processes, analysis, methods and/or functions described herein. For example, the computer 30 or handheld device 40 or other electronic data processing device employed in the system 10 may be provided, supplied and/or programmed with a suitable listing of code (e.g., such as source code, interpretive code, object code, directly executable code, and so forth) or other like instructions or software or firmware (e.g., such as an application to perform and/or administer the processing and/or image analysis and/or rendering or output described herein), such that when run and/or executed by the computer or other electronic data processing device one or more of the tasks, steps, processes, analysis, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, analysis, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, analysis, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred and/or other embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A system for automatically generating a two-dimensional (2D) floor plan of a building being studied, said system comprising:
    a camera that is employed to obtain a series of images over time as the camera is moved about a floor of the building being studied, each obtained image being represented by image data including a first set of data representing one or more color values of points observed by the camera and a second set of three-dimensional (3D) data representative of distances from the camera to the points observed by the camera; and
    a processor provisioned to generate the 2D floor plan from the image data, said 2D floor plan being defined by one or more polylines that represent one or more structures of the building and one or more polygons that represent an area of the floor which has been observed by the camera;
    wherein to generate the 2D floor plan, said processor:
        performs a local matching sub-process which is operative to align two adjacent images with one another, said adjacent images being obtained by the camera one after another in time;
        performs a global matching sub-process in which one or more key images are identified from the series of image and two key images, obtained by the camera apart in time from one another but sharing similar image content, are registered to one another;
        finds, for each image of the series, a 2D subset of points from the image data associated with each image, said 2D subset of points corresponding to a plane defined through the image data;
        determines the polylines based on said 2D subset of points; and
        defines the polygons based on the determined polylines and a determined pose of the camera.

2. The system of claim 1, wherein said camera is a video camera and the images in the series of images correspond to video frames captured by the video camera.

3. The system of claim 1, further comprising:
a handheld device in operative communication with said processor such that the generated 2D floor plan is selectively output on a screen of the handheld device.

4. The system of 1, wherein the 2D floor plan is incrementally grown in real or near-real time as the camera is moved about a floor of the building being studied.

5. The system of claim 1, further comprising a user interface through which a user can selectively make annotations to the generated 2D floor plan.

6. The system of claim 1, further comprising:
a humanly wearable device which carries the processor and on which the camera is mounted.

7. The system of claim 1, wherein the processor further performs a preprocessing sub-process prior to the local matching, said preprocessing sub-process being operative to: apply a camera calibration result to un-distort the image data, align the first and second data sets to one another and down-sample the image data.

8. The system of claim 1, wherein the local matching sub-process includes: identifying a set of one or more consistent features in the two adjacent images and matching said features between the two adjacent images.

9. The system of claim 1, wherein the processor determines said polylines by: extracting line segments from the 2D subset of points; rectifying the extracted line segments to a set of determined orientations; merging line segments groups by their rectified orientation; identifying valid and invalid intersections of merged lines segments; and defining the polylines based on the merged lines segments and identified intersections.

10. A method for automatically generating a two-dimensional (2D) floor plan of a building being studied, said method comprising:
obtaining a series of images captured over time by a camera as the camera is moved about a floor of the building being studied, each obtained image being represented by image data including a first set of data representing one or more color values of points observed by the camera and a second set of three-dimensional (3D) data representative of distances from the camera to the points observed by the camera; and
generating the 2D floor plan from the image data, said 2D floor plan being defined by one or more polylines that represent one or more structures of the building and one or more polygons that represent an area of the floor which has been observed by the camera;
wherein said generating includes:
performing a local matching sub-process which is operative to align two adjacent images with one another, said adjacent images being obtained by the camera one after another in time;
performing a global matching sub-process in which one or more key images are identified from the series of image and two key images, obtained by the camera apart in time from one another but sharing similar image content, are registered to one another;
finding, for each image of the series, a 2D subset of points from the image data associated with each image, said 2D subset of points corresponding to a plane defined through the image data;
determining the polylines based on said 2D subset of points; and
defining the polygons based on the determined polylines and a determined pose of the camera.

11. The method of claim 10, wherein said camera is a video camera and the images in the series of images correspond to video frames captured by the video camera.

12. The method of claim 10, further comprising:
outputting the 2D floor plan on a screen.

13. The method of 10, wherein the 2D floor plan is incrementally grown in real or near-real time as the camera is moved about a floor of the building being studied.

14. The method of claim 10, further comprising:
providing a user interface through which annotations to the generated 2D floor plan can be received from a user.

15. The method of claim 10, further comprising performing a preprocessing sub-process prior to the local matching, said preprocessing sub-process being operative to: apply a camera calibration result to un-distort the image data, align the first and second data sets to one another and down-sample the image data.

16. The method of claim 10, wherein the local matching sub-process includes: identifying a set of one or more consistent features in the two adjacent images and matching said features between the two adjacent images.

17. The method of claim 10, wherein determining said polylines includes: extracting line segments from the 2D subset of points; rectifying the extracted line segments to a set of determined orientations; merging line segments groups by their rectified orientation; identifying valid and invalid intersections of merged lines segments; and defining the polylines based on the merged lines segments and identified intersections.

* * * * *